United States Patent
Strege et al.

(10) Patent No.: US 10,444,010 B2
(45) Date of Patent: Oct. 15, 2019

(54) METHOD FOR DETECTING SUPPORT SURFACE VARIATIONS DURING WHEEL ALIGNMENT ROLLING COMPENSATION PROCEDURE

(71) Applicant: Hunter Engineering Company, St. Louis, MO (US)

(72) Inventors: Timothy A. Strege, Sunset Hills, MO (US); Daniel R. Dorrance, Ballwin, MO (US)

(73) Assignee: Hunter Engineering Company, St. Louis, MO (US)

( * ) Notice: Subject to any disclaimer, the term of this patent is extended or adjusted under 35 U.S.C. 154(b) by 191 days.

(21) Appl. No.: 15/068,299

(22) Filed: Mar. 11, 2016

(65) Prior Publication Data

US 2016/0273914 A1    Sep. 22, 2016

Related U.S. Application Data (60) Provisional application No. 62/135,541, filed on Mar. 19, 2015.

(51) Int. Cl.
    *G01B 11/275*    (2006.01)
(52) U.S. Cl.
    CPC ...... *G01B 11/2755* (2013.01); *G01B 2210/20* (2013.01)
(58) Field of Classification Search
    None
    See application file for complete search history.

(56) References Cited

U.S. PATENT DOCUMENTS

| | | | |
|---|---|---|---|
| 6,134,792 A | 10/2000 | January | |
| 6,219,134 B1 | 4/2001 | Voeller et al. | |
| 7,869,018 B2 * | 1/2011 | Strege | B66F 7/28 356/139.09 |
| 7,974,806 B1 | 7/2011 | Burns et al. | |
| 8,033,028 B2 | 10/2011 | Stieff et al. | |
| 8,215,023 B2 | 7/2012 | Stieff et al. | |
| 8,457,925 B1 | 6/2013 | Stieff et al. | |
| 2006/0126966 A1 * | 6/2006 | Strege | B66F 7/28 382/289 |
| 2014/0111645 A1 | 4/2014 | Shylanski et al. | |
| 2014/0278226 A1 | 9/2014 | Stieff et al. | |
| 2016/0195388 A1 † | 7/2016 | D'Agostino | |
| 2018/0238682 A1 | 8/2018 | D'Agostino et al. | |

\* cited by examiner
† cited by third party

*Primary Examiner* — Alexander G Ghyka
(74) *Attorney, Agent, or Firm* — Sandberg Phoenix & von Gontard, P.C.

(57) ABSTRACT

A method for detecting the occurrence of deviations from level, straight-line rolling movement of a wheel assembly across a supporting surface during a rolling compensation procedure associated with a vehicle wheel alignment measurement or inspection system by identifying changes in measurements or calculated parameters associated with the wheel assembly which would be unchanged during an ideal level and straight-line rolling movement. Identified changes in the measurements or calculated parameters are evaluated to either warn an operator of the occurrence of a deviation, or to generate a correction factor to account for at least a portion of an effect which the deviations introduce into compensation calculations or subsequent wheel alignment measurements or service procedures.

10 Claims, 6 Drawing Sheets

METHOD FOR DETECTING SUPPORT SURFACE VARIATIONS DURING WHEEL ALIGNMENT ROLLING COMPENSATION PROCEDURE

CROSS-REFERENCE TO RELATED APPLICATIONS

The present application is related to, and claims priority from, U.S. Provisional Patent Application Ser. No. 62/135,541 filed on Mar. 19, 2015, which is herein incorporated by reference.

STATEMENT REGARDING FEDERALLY SPONSORED RESEARCH

Not Applicable.

BACKGROUND OF THE INVENTION

The present application is related to vehicle wheel alignment measurement procedures, and in particular, to a procedure for utilizing data acquired during a vehicle wheel alignment rolling compensation procedure to detect variations in the flatness or uniformity of a surface over which the vehicle is rolling, and to compensate subsequently acquired measurements for effects of any detected surface variations.

In any vehicle wheel alignment measurement system, an orientation of an axis of rotation for each individual wheel assembly of the vehicle must be determined before alignment angles associated with the wheel assemblies can be measured or calculated. In an ideal application, angle sensors or optical targets associated with the vehicle wheel alignment system are mounted to the wheel assemblies in precise alignment with the wheel assembly axis of rotation, enabling measurements to be directly obtained. In practice, precise alignment of the sensors or targets with the wheel assembly axis of rotation is difficult to achieve due to various factors such as imperfections in the wheel assembly surfaces, improper attachment of the sensor or target, machining tolerances, etc.

While a precise alignment to within an acceptable tolerance between sensors or optical targets and the wheel assembly can be achieved through the use of highly accurate machined components and special "no-comp" mounting adapters for securing a sensor or optical target to the wheel assembly, it is not always an optimal solution. When a "no-comp" wheel adapter is mounted on the wheel assembly in a precise and determined mounting using machined provisions on either a wheel or brake hub, the axis of the wheel adapter is expected to be coaxial with the axis of rotation of the wheel assembly. A pre-compensated vehicle wheel alignment sensor or optical target is then mounted in the aligned socket of the wheel adapter, and alignment measurements are obtained without any further compensation steps. However, any damage to the wheel adapter, or foreign objects or debris present in the interface between the wheel adapter and the machined provisions on the wheel assembly or brake hub will cause erroneous readings. Furthermore, due to the precision machining required, the "no-comp" adapters are expensive components to manufacture, and must be handled with care to ensure continued accuracy.

In an alternative to using "no-comp" precision mounting adapters, a vehicle wheel alignment measurement system may identify and accommodate the reality of imperfections introduced by mounting an alignment sensor or optical target onto a wheel assembly without precise coaxial alignment to the wheel assembly axis of rotation. One such method utilizes a compensation procedure which involves observing changes in parameters associated with a wheel assembly, such as camber and/or a toe angles, measured by the vehicle wheel alignment system using the secured alignment sensor or optical target, at different rotational positions of a wheel assembly on which the alignment sensor or optical target is mounted. These rotational positions may be observed by rolling the vehicle over a flat surface for a distance sufficient to acquire the necessary measurement data. Measurement changes which are caused by any eccentricity in the mounting of each alignment sensor or optical target to the wheel assembly are identified by an observable sinusoidal pattern in the resulting measurements, enabling subsequent measurements to be suitably compensated for the observed eccentricity at any rotational position of the wheel assembly.

Deviations from level, straight-line rolling movement of the wheel assembly during the rolling compensation observations can affect the outcome of the compensation calculations. These deviations result from the vehicle being steered during the rolling movement, which alters wheel assembly orientation, or from rolling the wheel assembly over an un-level surface, such as a vehicle lift runway which is warped, bent, twisted, or which has some form of surface discontinuity, such as a gap, ridge, bump, or portions of differing elevations. Accordingly, it would be beneficial to provide a method for detecting the occurrence of some or all of these deviations during the rolling compensation observations, either to provide a warning to the operator, or to account for some or all of the deviations during the compensation calculations in order to reduce the resulting effects on the rolling compensation values.

BRIEF SUMMARY OF THE INVENTION

Briefly stated, the present disclosure sets forth a method for detecting the occurrence of deviations from level, straight-line rolling movement of a wheel assembly during the rolling compensation procedure associated with a vehicle wheel alignment measurement system by identifying changes in measurements or calculated parameters associated with the wheel assembly which would be unchanged during an ideal level and straight-line rolling movement. Identified changes in the measurements or calculated parameters are evaluated to warn an operator of the occurrence of a deviation, and/or to generate a correction factor to account for at least a portion of an effect which the deviations introduce into compensation calculations or subsequent wheel alignment measurements.

In an embodiment of the present disclosure, an optical target is secured to a wheel assembly on a vehicle and observed by a machine vision sensor of a vehicle wheel alignment system during a rolling compensation procedure prior to obtaining measurements associated with alignment angles of the vehicle and wheel assembly. Observations of the optical target acquired at various points during the rolling movement of the wheel assembly are used to calculate a set of piercing point values representative of points of intersection between the wheel assembly axis of rotation and a plane defined by the secured optical target. For level, straight-line rolling movement of the wheel assembly, sequentially determined piercing point values will exhibit changes which are below a tolerance threshold. If the wheel assembly is rolled over a surface which varies from level, or if the wheel assembly is steered during the rolling movement, one or more of the calculated piercing point values will vary from a preceding value by more than an acceptable tolerance. The vehicle wheel alignment system is responsive to detected changes in piercing point values exceeding an acceptable tolerance to take appropriate action in the form of either an operator warning or implementation of corrective action.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Turning to the Figures in general, the present disclosure sets forth in one embodiment, a method for detecting, during a rolling compensation procedure associated with the acquisition of vehicle wheel alignment measurements from a vehicle by a vehicle wheel alignment measurement system or a vehicle inspection system, an occurrence of movement by a wheel assembly which deviates from level and/or straight-line rolling movement. Such deviating movement by the wheel assembly may be introduced by a change in the supporting surface on which the wheel assembly is rolling, such as a floor or lift rack runway, or by a sudden or abrupt change in the steering of the vehicle during the rolling movement.

A rolling compensation procedure is intended to acquire measurement data values from a sensor arrangement, such as an angle sensor or an optical target such as shown in U.S. Pat. No. 6,134,792 to January, herein incorporated by reference, associated with a parameter of the wheel assembly as the vehicle rolls a short distance across a supporting surface. The acquired parameter measurement data values are utilized to calculate correction factors to account for variations in the mounting of a sensor component onto the wheel assembly. To obtain the best correction factors, the wheel assembly should be rolled in an ideal manner, i.e., on a level supporting surface and in a straight line. Changes in the vertical elevation of the supporting surface on which the wheel assembly is rolled, such as may be caused by gaps, ridges, bumps, or movement from one supporting surface onto another, result in movement deviations which can introduce errors into the calculations used to determine the correction factors, which in turn can affect the precision of any subsequent wheel alignment measurements which are acquired or determined using the sensor arrangement or optical target mounted to the wheel assembly.

Figure 1:
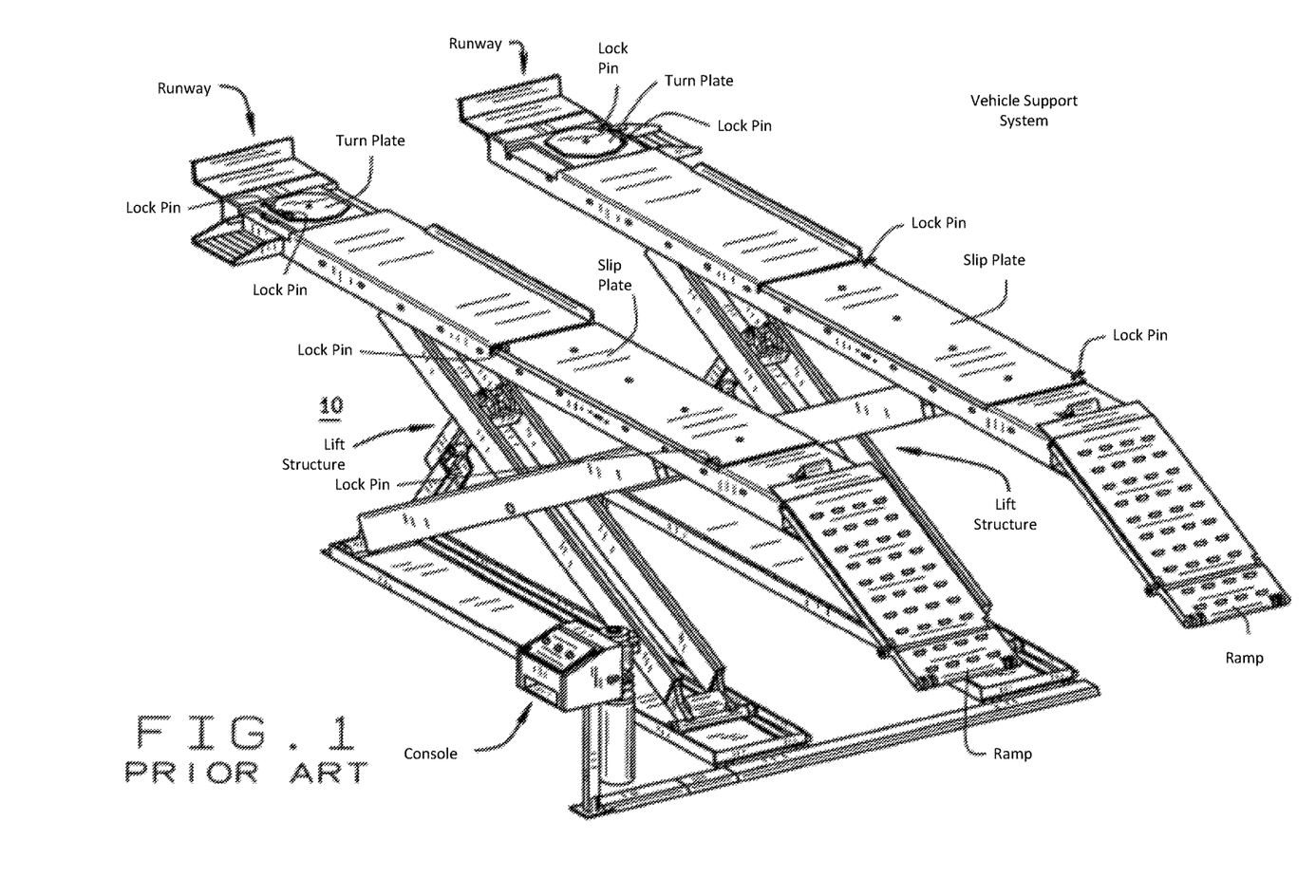
FIG. 1 is a perspective view of a prior art vehicle lift structure used for automotive alignment measurement procedures.
Figure 2:
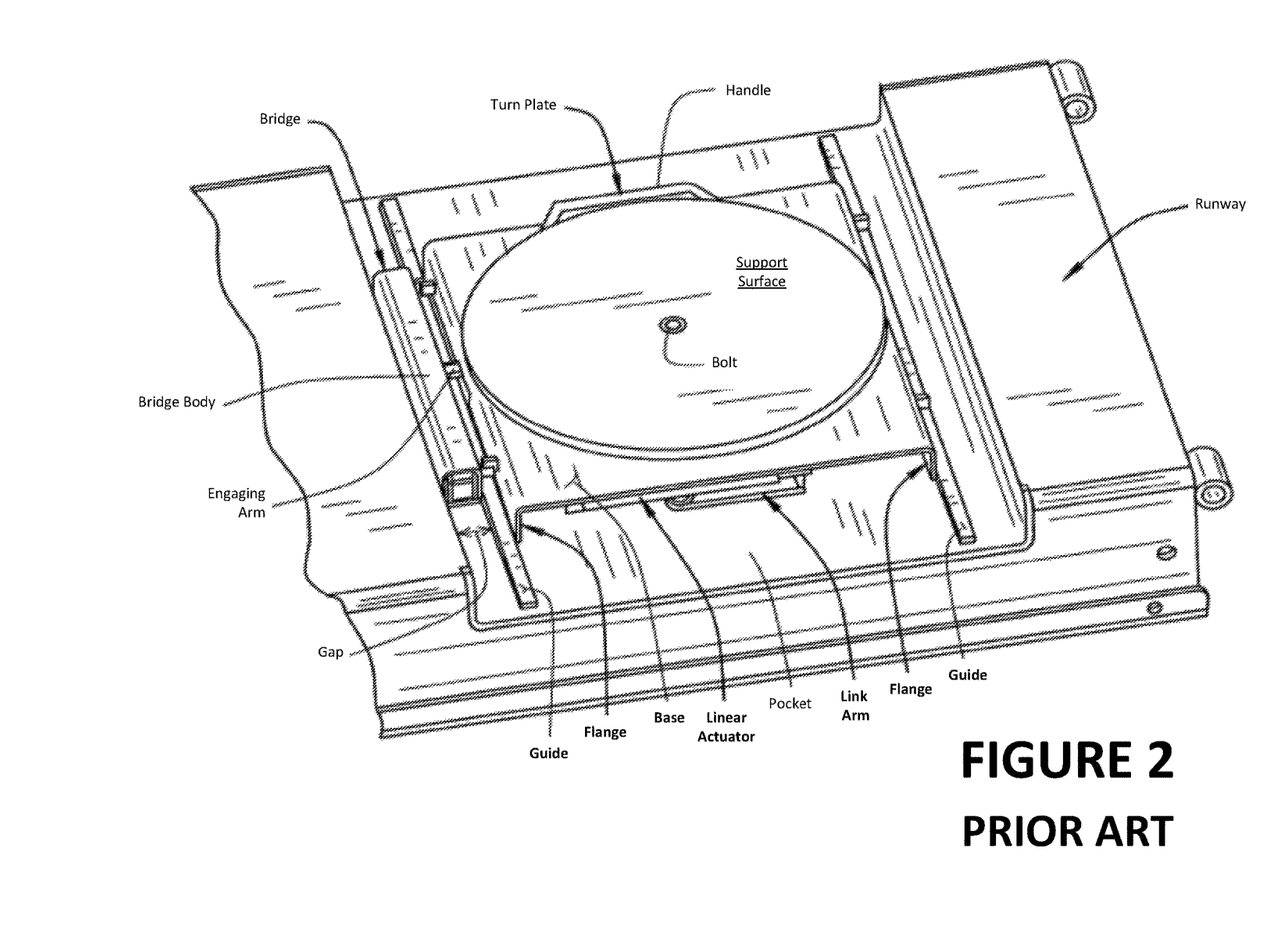
FIG. 2 is a perspective view of a prior art turn plate assembly of the vehicle lift structure of FIG. 1.
Figure 3:
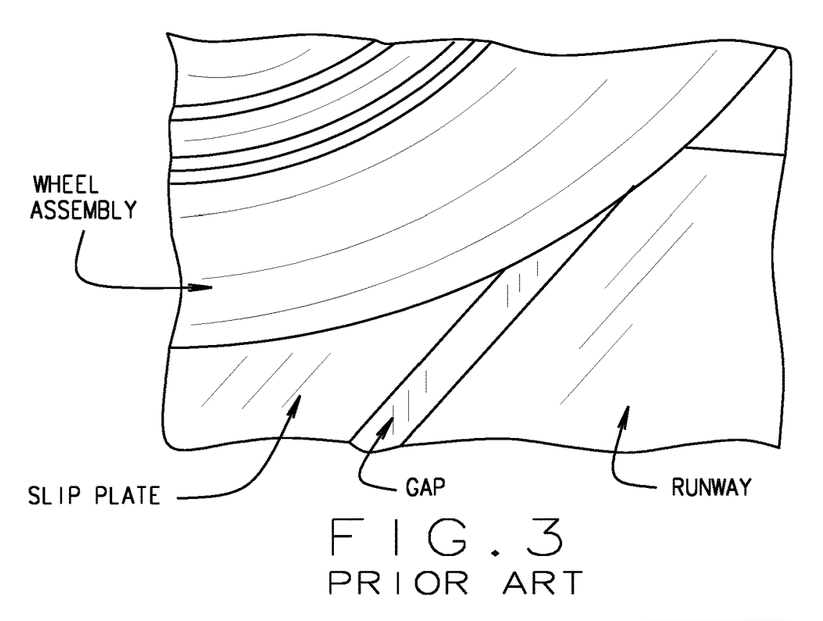
FIG. 3 is a perspective view of a wheel transitioning over a gap between a runway surface and a slip plate as found in the vehicle lift structure of FIG. 1.
Figure 4:
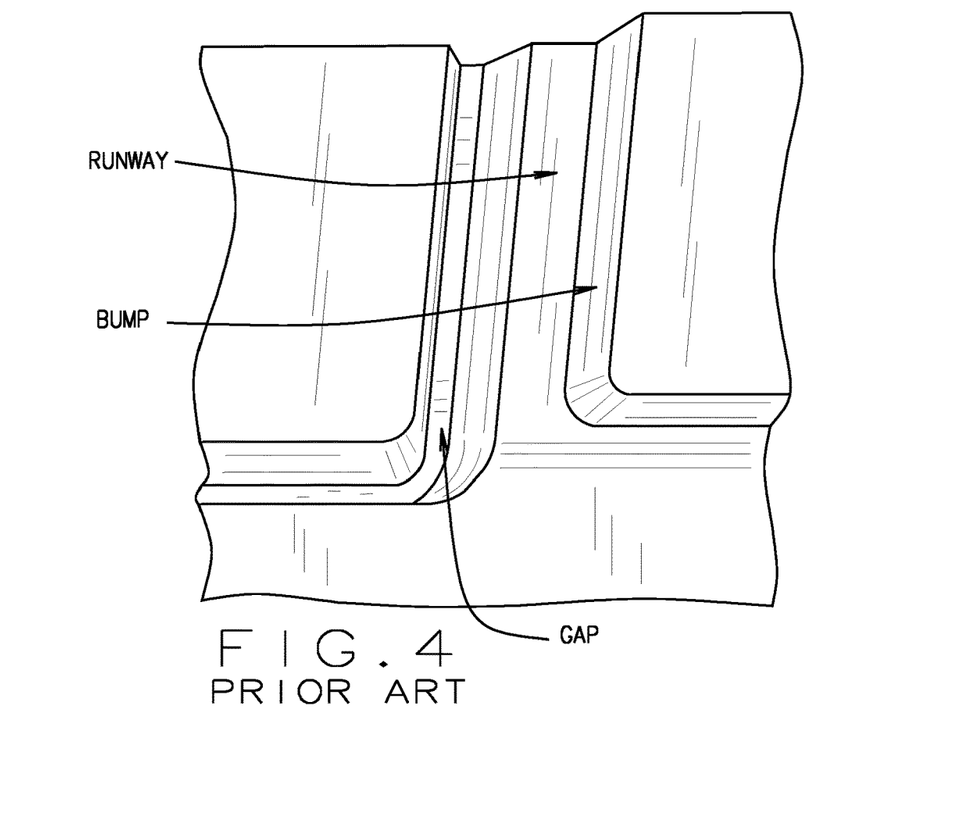
FIG. 4 is a perspective view of a gap and a bulge in the surface of a prior art runway over which a vehicle wheel may roll.
Figure 5:
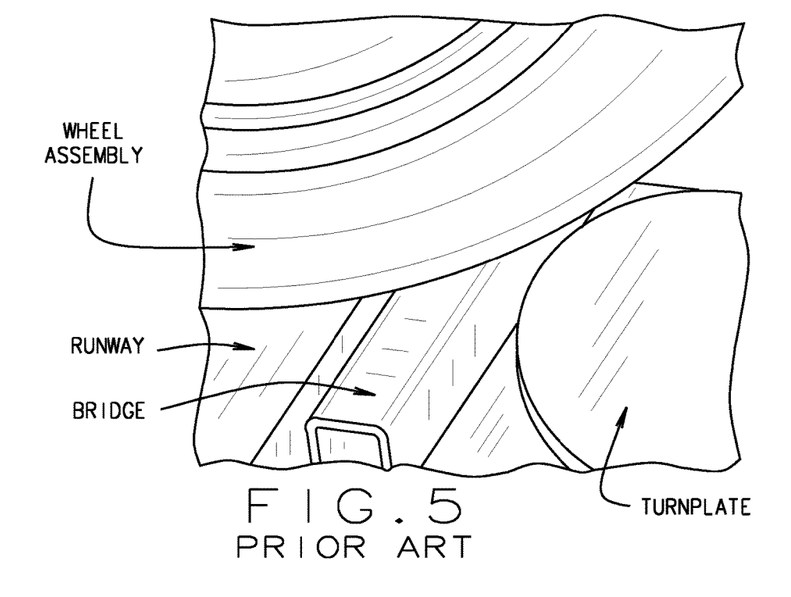
FIG. 5 is a perspective view of a wheel transitioning from a runway surface, over a bridge element, onto a turn plate as found in the vehicle lift structure of FIG. 1.
Figure 6:
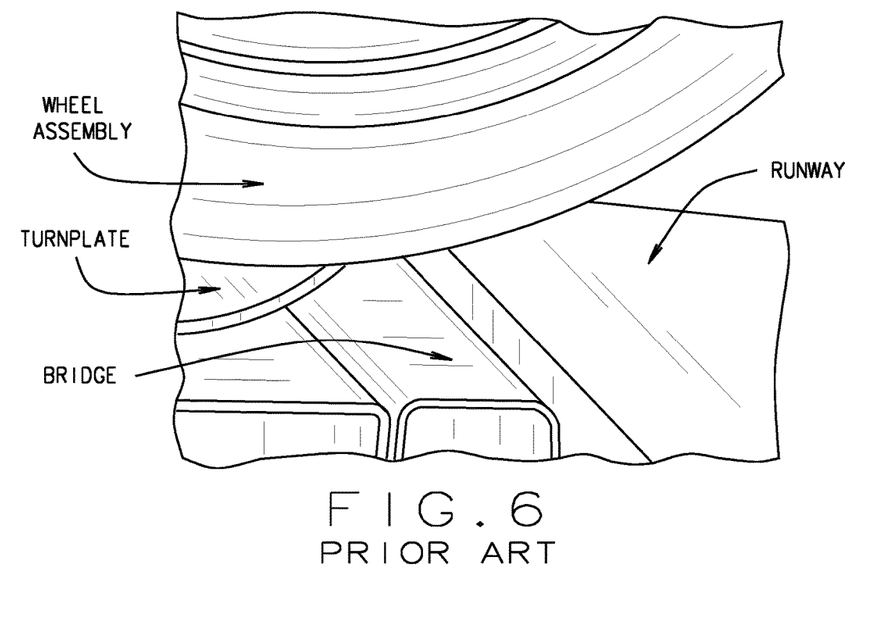
FIG. 6 is a perspective view of a wheel transitioning from a turn plate onto a runway surface such as found in the vehicle lift structure of FIG. 1.

For example, as a vehicle is rolled on the runway surfaces of an alignment lift rack, such as shown in FIGS. 1-6, the wheel assemblies may roll over gaps, transitions, or changes in elevation between the ramps and runway surfaces, rear slip plates (FIG. 3), raised portions or bumps in the runway surfaces (FIG. 4), or gaps between the runways surfaces and turn plate support surfaces (FIGS. 5 and 6). Alternatively, the vehicle may be rolled on a ground surface, such as the surface of a vehicle service bay, in which case, variations in the supporting floor surface may introduce errors as the wheel assemblies are rolled over them. Similarly, sudden or abrupt changes in a steering angle of a steered wheel assembly as it is rolled, such as by turning of the vehicle, can introduce errors into the calculations used to determine the correction factors, which in turn can affect the precision of any subsequent measurements which are acquired or determined using the sensor arrangement or optical target mounted to the steered wheel assembly.

Some of the parameter data values sequentially measure or acquired during a rolling compensation procedure will be invariant (to within an accepted tolerance), or will vary from one data point to the next within a limited range during an ideal rolling movement. For example, assuming a wheel assembly has a uniform rolling radius, it can be expected that an intersection point between the wheel assembly axis of rotation and a plane defined by an optical target secured to the wheel assembly (i.e., the piercing point parameter value as described in U.S. Pat. No. 8,215,023 B2 to Stieff et al. herein incorporated by reference) will remain vertically stable, and only translate in the direction of the ideal rolling motion. If a relative vertical spatial position of the piercing point parameter value is determined or observed by a vehicle wheel alignment measurement or inspection system to change beyond an acceptable tolerance during the actual rolling motion of the wheel assembly, and assuming that the rolling radius of the wheel assembly and the mounting of the optical target remains unchanged, it may be concluded that the vertical movement deviation is due to a change in the elevation of the surface over which the wheel assembly rolled. Similarly, during an ideal rolling movement, the orientation of the wheel assembly axis of rotation remains unchanged, merely translating in the direction of the rolling movement. Determined or observed changes in a parameter data value representing the orientation of the wheel assembly axis of rotation exceeding an acceptable tolerance during actual rolling motion are potentially indicative of a movement deviation in the steering angle of the wheel assembly. These determined or observed changes in an invariant parameter data value or those which exceed an expected range of values for a varying parameter are evaluated to either warn an operator of the occurrence of a movement deviation, or to generate a correction factor to account for at least a portion of an effect which the movement deviations introduce into compensation calculations or subsequent wheel alignment measurements.

In an embodiment of the present disclosure for use with a machine vision vehicle wheel alignment measurement or inspection system, an optical target secured to a wheel assembly of a vehicle is observed by a machine vision sensor of the vehicle wheel alignment measurement or inspection system as the vehicle is rolled during a rolling compensation procedure, prior to obtaining measurements associated with alignment angles of the vehicle and individual wheel assemblies. Using observations of the optical target at various points during the rolling compensation procedure movement, a set of parameter values for associated piercing point spatial coordinates are calculated by the machine vision vehicle wheel alignment measurement or inspection system, representative of points of intersection between the wheel assembly axis of rotation and a plane defined by the face of the optical target. For level, straight-line rolling movement of the wheel assembly, sequentially determined parameter values for the piercing point spatial coordinates will only exhibit changes in a vertical direction which are below a tolerance threshold. If the wheel assembly is rolled over a surface which varies from level, or if the wheel assembly is steered during the rolling movement, one or more of the calculated parameter values for the piercing point spatial coordinates will exhibit a change from a preceding parameter value which exceeds a tolerance. The vehicle wheel alignment system is responsive to detected changes in the piercing point parameter value exceeding the tolerance to take appropriate action in the form of either an operator warning or implementation of corrective action.

Figure 7:
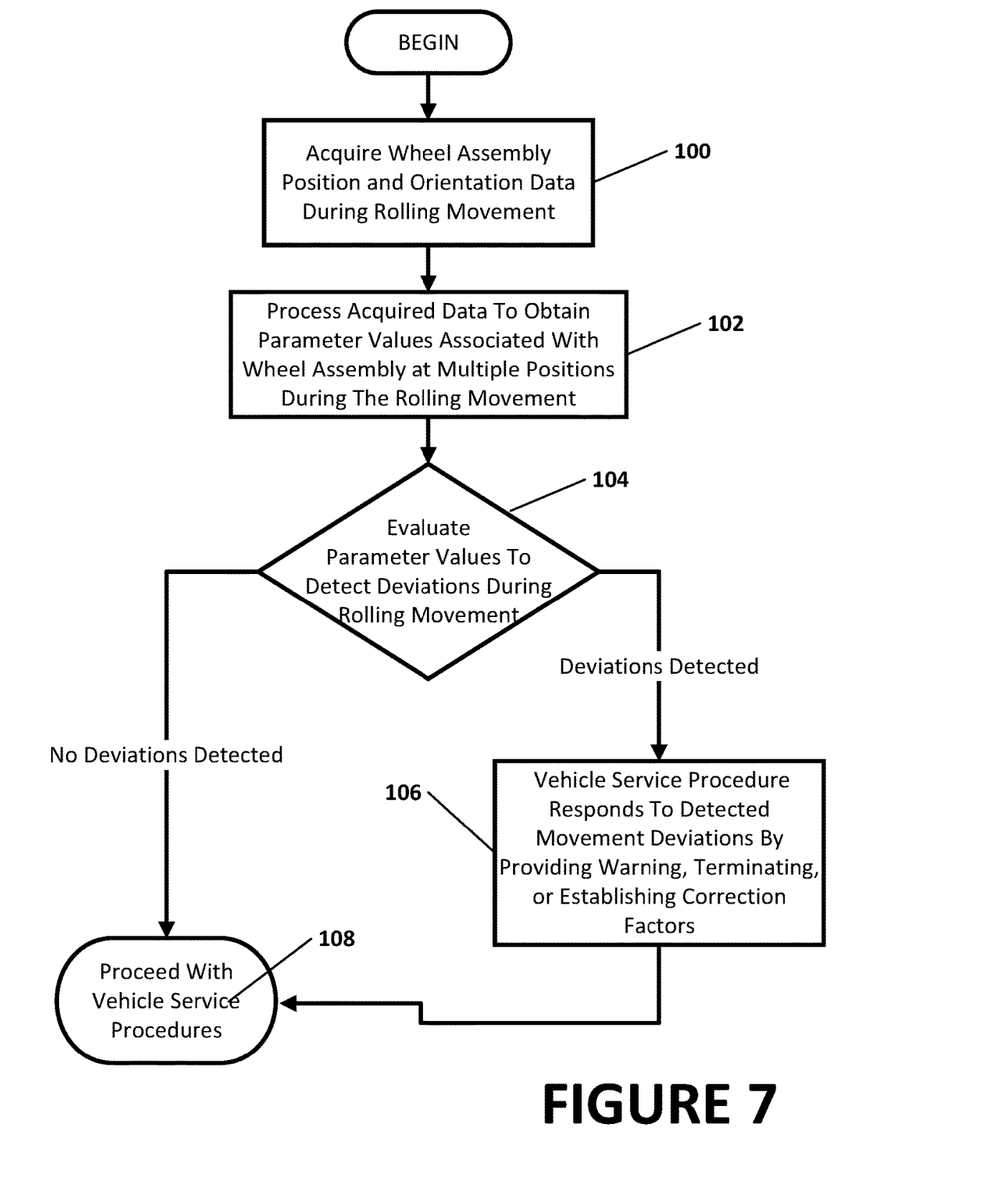
FIG. 7 is a flow chart illustrating a method of the present disclosure.

In a further embodiment, illustrated generally in FIG. 7, the present disclosure sets for a method for detecting the occurrence of a deviation from the expected movement of a wheel assembly during a rolling movement of a vehicle across a supporting surface. Initially, an optical target for use with a machine vision vehicle wheel alignment measurement or inspection system is secured to the wheel assembly. Data associated with parameters of the wheel assembly is then acquired at a plurality of rotational positions as the vehicle is rolled across the supporting surface, using a vehicle wheel alignment measurement or inspection system (Box 100). During the rolling movement, images of the optical target are acquired by a machine vision sensor associated with the vehicle wheel alignment measurement or inspection system. Alternatively, a collection of data points associated with one or more of the parameters of the wheel assembly may be acquired by multiple sensors over the course of the rolling movement. For example, a set of linear laser displacement sensors associated with a vehicle inspection system, arranged generally parallel to the vehicle's path of motion, may acquire data representative of displacements to discrete points on the surface of the wheel assembly, such as the wheel rim edge.

The acquired data (such as the sequence of images or collection of displacement values) is evaluated by a vehicle wheel alignment measurement or inspection system processor configured with suitable software instructions, to obtain a sequence of parameter values (such as optical target pose parameters or wheel rim edge positions) which are representative of one or more parameters associated with the wheel assembly in each of the plurality of positions (Box 102). The parameters are selected to be either invariant during an ideal rolling movement of the wheel assembly, or to only vary within an acceptable range during an ideal rolling movement of the wheel assembly.

Once acquired, the sequence of parameter values is evaluated (Box 104), such as by the processor having a suitable set of software instructions, to identify the presence of any parameter values in the sequence which deviated during the rolling movement from sequentially adjacent or expected parameter values by more than an acceptable tolerance associated with the measured values. For parameters which are considered to be invariant, such as an optical target piercing point or a wheel rim edge vertical position, the acceptable tolerance is representative of an acceptable variation (such as a measurement accuracy limit) between sequential values representative of said parameter associated with the wheel assembly, whereas for parameters which vary within in acceptable range, such as the orientation of the wheel assembly axis of rotation, the tolerance is representative of an acceptable change between sequential values representative of the parameter.

Measurements having unacceptable deviation may be representative of movement deviations from an ideal rolling movement during the rolling movement of the wheel assembly. For example, a deviation in a parameter value may correspond to a change in vertical elevation of the wheel assembly during the rolling movement, or may correspond to a change in a steering angle of the wheel assembly during the rolling movement. If any deviating parameter values are identified, a standard workflow of procedures implemented by the vehicle wheel alignment measurement or inspection system is adjusted, either automatically or manually by an operator, to take an appropriate responsive action (Box 106) before continuing (Box 108). A responsive action may include generating a warning to the operator indicating the occurrence of a movement deviation, restarting the rolling procedure, determining one or more correction factors to apply to subsequent measurements or compensation values associated with the vehicle to offset at least a portion of any measurement effects introduced by the movement deviation, and/or excluding or compensating some of the parameter values from the subsequent computations. Warnings provided to an operator by the vehicle wheel alignment measurement or inspection system may optionally include an identification of the type of movement deviation detected (change in vertical elevation, steering movement, etc.), and/or an indication of the corresponding location of the wheel assembly on the rolling surface at the time the movement deviation occurred. Receiving an indication of the location on the rolling surface where the movement deviation occurred enables an operator to check for obvious problems with the rolling surface, such as the presence of gaps, elevation changes, or foreign objects.

Figure 8:
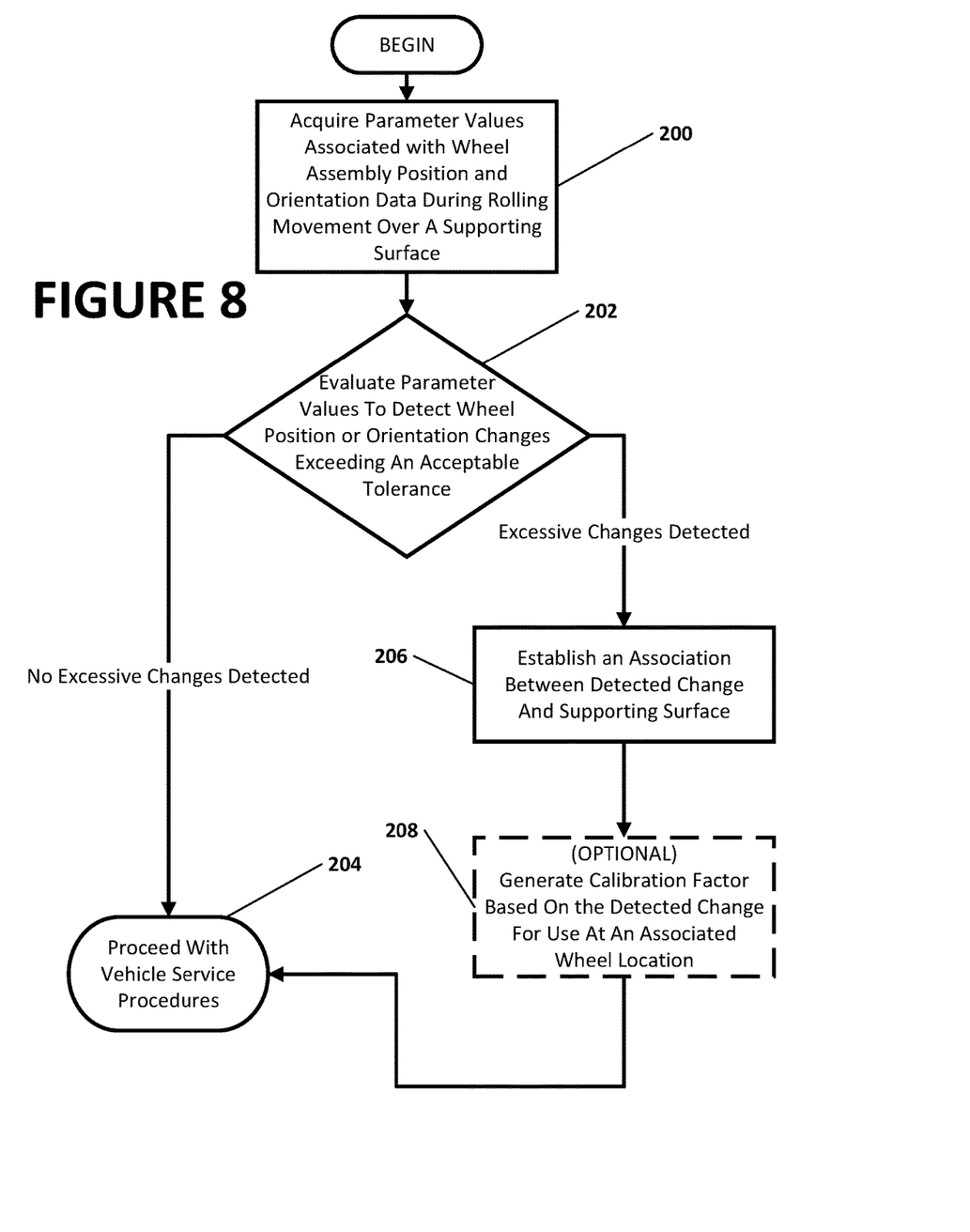
FIG. 8 is a flow chart illustrating an alternate method of the present disclosure.

In a further embodiment of the present disclosure, illustrated in FIG. 8, parameter data associated with the wheel assembly is initially acquired with a machine vision vehicle wheel alignment measurement or inspection system and an optical target secured to the wheel assembly. The parameter data is acquired at a plurality of rotational positions of the wheel assembly during a rolling movement of the vehicle across the supporting surface, such as during a rolling compensation procedure (Box 200). During the rolling movement, a sequence of images of the optical target is acquired by a machine vision sensor associated with the vehicle wheel alignment measurement or inspection system. The acquired data (such as the sequence of images) is evaluated by a suitably configured processor of the vehicle wheel alignment measurement or inspection system, to obtain a sequence of values (such as optical target pose parameters) which are representative of a parameter associated with the wheel assembly in each of the plurality of positions (Box 202).

If no excessive changes in the parameter data values are detected during the rolling movement, the wheel assemblies of the vehicle are assumed to have rolled over a sufficiently smooth surface, and the vehicle service procedures may continue normally. (Box 204). If, however, there are detected changes in a parameter value resulting from movement deviations in wheel position or orientation of wheel assembly which exceed an acceptable tolerance during the rolling movement, the specific location or region on the supporting surface over which the wheel assembly was rolling at the time the parameter change occurred is recorded. (Box 206). When proceeding with the vehicle service procedures, measurements acquired while the wheel assembly is located at one of these identified locations or within one of these identified regions are either flagged as potentially inaccurate due to the surface variations, excluded entirely, or optionally compensated (Box 208) using generated calibration factors based on the observed detected changes, so as to not unduly influence the outcome of the vehicle service procedures in a negative manner.

Those of ordinary skill in the field of vehicle wheel alignment and measurement will recognize that the methods and procedures described herein are not limited to use vehicle service systems such as wheel alignment measurement or inspection systems employing machine vision sensors or laser displacement sensors, but may be utilized with any vehicle service system which acquires measurements associated with a wheel assembly rolling across a supporting surface. Similarly, the specific measurements or parameters associated with the wheel assembly which are determined from the acquired measurements are not limited to piercing point values, steering axis orientations, and wheel rim edge measurements, and may include any of a variety of measurements which are expected to remain generally invariant during the rolling movement of the wheel assembly. For example, if an inclinometer or a conventional wheel alignment sensor such as a DSP-700T manufactured and sold by Hunter Engineering Company of St. Louis, Miss. is secured to the face of the wheel assembly, a tilt or orientation of the wheel assembly observed by the wheel-mounted sensor or inclinometer may be expected to remain generally invariant during rolling movement of the wheel assembly on a horizontal planar surface.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

The invention claimed is:

1. A method for detecting and accommodating an occurrence of a movement deviation by a vehicle wheel assembly during a rolling movement across a supporting surface, comprising:
   rolling the wheel assembly across the supporting surface to generate the rolling movement;
   acquiring data associated with the wheel assembly at a plurality of positions across said supporting surface during the rolling movement;
   processing said acquired data to obtain a set of values representative of a wheel assembly parameter in each of said plurality of positions across said supporting surface;
   evaluating said set of parameter values to identify each value in said set of parameter values which deviated, during said rolling movement, from an expected value by more than an acceptable tolerance in response to a movement deviation by the wheel assembly at an associated position on said supporting surface; and
   determining a correction factor to offset at least a portion of an effect introduced into a wheel assembly measurement by said movement deviation occurring when said wheel assembly is at said associated position on said supporting surface during a vehicle service procedure.

2. The method of claim 1 wherein said parameter is invariant during an ideal rolling movement, and wherein said acceptable tolerance is representative of an acceptable variation between sequential values representative of said parameter associated with the wheel assembly.

3. The method of claim 1 wherein said movement deviation is a change in a vertical elevation of said wheel assembly during said rolling movement across said supporting surface.

4. The method of claim 1 wherein said movement deviation is a change in a steering angle parameter of said wheel assembly during said rolling movement across said supporting surface.

5. The method of claim 1 wherein said step of acquiring data includes
   securing an optical target to said wheel assembly;
   acquiring, with a machine vision sensor, a sequence of images of said optical target at discrete rotational positions of the wheel assembly during said rolling movement across said supporting surface; and
   processing said acquired sequence of images to identify a set of pose parameters for said optical target at each of said discrete rotational positions.

6. The method of claim 1 wherein said parameter associated with the wheel assembly in each of said plurality of positions is spatial position of a piercing point of an optical target secured to the wheel assembly, said optical target piercing point defined by a point of intersection between a wheel assembly axis of rotation during said rolling movement and a plane of said optical target; and
   wherein said movement deviation of said wheel assembly results in a change in said spatial position of said piercing point of said optical target during said rolling movement across said supporting surface.

7. The method of claim 1 wherein said measurement effect at least partially offset by a determined correction factor is a change in a compensation value established by said rolling compensation procedure.

8. A method for compensating measurements of a wheel assembly for effects of local variations in a supporting surface, comprising:

rolling the wheel assembly across the supporting surface to generate a rolling movement;

acquiring spatial data associated with the wheel assembly at a plurality of locations on said supporting surface during said rolling movement;

evaluating said spatial data to detect a change in a vertical position or an orientation of the wheel assembly between adjacent locations exceeding an acceptable tolerance; and associating said detected change with one of said adjacent locations on said surface supporting said wheel assembly;

generating a measurement correction factor for said associated location based on said detected changes in said vertical position or orientation of said wheel assembly at said associated location; and applying said measurement correction factor to each subsequent measurement of the wheel assembly acquired when the wheel assembly is disposed at said associated location to establish at least one corrected measurement, said generated correction factor compensating said subsequent measurements for at least a portion of a measurement effect introduced by said change in vertical position or orientation of the wheel assembly at said associated location on said supporting surface.

9. The method of claim 8 wherein said evaluation of said spatial data associated with said wheel assembly determines, at each of said positions of the wheel assembly, a piercing point defined by a point of intersection between an axis of rotation of said wheel assembly and a plane defined by an optical target secured to said wheel assembly.

10. A method for detecting an occurrence of a movement deviation during a wheel assembly rolling compensation procedure of a machine-vision vehicle service system, comprising:

securing an optical target to a surface of said wheel assembly;

rolling the wheel assembly about an axis of rotation across a supporting surface to establish a rolling movement;

observing said optical target to acquiring data associated with the wheel assembly at a plurality of positions during said rolling movement;

processing said acquired data to obtain a set of values representing, at each of said plurality of positions, a spatial position for a piercing point of said optical target, said piercing point defined by a point of intersection between said wheel assembly axis of rotation and a plane of said optical target;

evaluating said set of values to identify each value in said set which deviated, during said rolling movement, from an expected value by more than an acceptable tolerance in response to a movement deviation of the wheel assembly at an associated position on said supporting surface; and selecting, within a vehicle service procedure, an action in response to said evaluation identifying at least one deviated value, said action including at least one of (a) generating a warning to an operator, and (b) determining a correction factor to compensate a measurement of said wheel assembly for at least a portion of an effect introduced by said movement deviation occurring when said wheel assembly is at said associated position on said supporting surface.

\* \* \* \* \*